US006665921B2

(12) United States Patent
Winterfeldt et al.

(10) Patent No.: US 6,665,921 B2
(45) Date of Patent: Dec. 23, 2003

(54) PULLER APPARATUS AND METHOD FOR PULLING

(76) Inventors: Bryan Winterfeldt, 21230 - 746th Ave., Dassel, MN (US) 55325; Todd Freeman, 26215 - 705th Ave., Dassel, MN (US) 55325

( * ) Notice: Subject to any disclaimer, the term of this patent is extended or adjusted under 35 U.S.C. 154(b) by 70 days.

(21) Appl. No.: 09/845,364

(22) Filed: Apr. 30, 2001

(65) Prior Publication Data

US 2002/0157232 A1 Oct. 31, 2002

(51) Int. Cl.[7] .......................... B23P 19/00; B23P 19/04

(52) U.S. Cl. .......................... 29/426.5; 29/259; 29/256; 29/257; 29/258

(58) Field of Search ................................ 29/426.5, 758, 29/259, 261, 256, 257, 258, 260, 262, 263, 269, 266

(56) References Cited

U.S. PATENT DOCUMENTS

| | | | | | |
|---|---|---|---|---|---|
| 520,258 | A | | 5/1894 | Davis | |
| 977,018 | A | | 11/1910 | Kopietz | |
| 1,469,076 | A | | 9/1923 | Eaber | |
| 1,631,872 | A | | 6/1927 | Knight | |
| 4,123,838 | A | | 11/1978 | Magavero | |
| 4,570,319 | A | | 2/1986 | Skoworodko | |
| 4,624,449 | A | | 11/1986 | Gentry | |
| 4,649,615 | A | | 3/1987 | Hundley | |
| 4,658,488 | A | | 4/1987 | Johnstead | |
| 4,756,214 | A | | 7/1988 | Valtri et al. | |
| 4,989,312 | A | * | 2/1991 | Maddalena | 29/259 |
| 5,003,682 | A | | 4/1991 | Strausbaugh et al. | |
| 5,033,180 | A | | 7/1991 | Colson | |
| 5,261,149 | A | * | 11/1993 | Sutton | 29/261 |
| 5,606,788 | A | * | 3/1997 | Rubino et al. | 29/259 |
| 5,781,977 | A | | 7/1998 | Servones | |

* cited by examiner

*Primary Examiner*—John C. Hong
(74) *Attorney, Agent, or Firm*—Haugen Law Firm PLLP

(57) ABSTRACT

An improved puller apparatus for pulling various articles, including automotive pitman arms, includes a puller frame having a base and at least one upstanding arm extending therefrom, the arms having inwardly extending gripping projections for transmitting pulling force to the article being pulled, the base having an aperture extending therethrough for receiving pushing means, which pushing means include an actuation means disposed at a portion of the pushing means proximal to the article being pulled, such that a user may engage the actuation means at a position within the puller frame to axially move the pushing rod against a relatively stationary interiorly disposed object around which the article to be removed is mounted. The pushing force applied against the interiorly disposed object creates a corresponding reaction force in a direction opposite the pushing force, which reaction force is transmitted to the article being removed via the gripping projections on the puller frame.

24 Claims, 1 Drawing Sheet

PULLER APPARATUS AND METHOD FOR PULLING

FIELD OF THE INVENTION

The present invention relates to puller devices generally, and more particularly to devices for pulling automotive pitman arms. The present invention also relates to methods for pulling automotive pitman arms.

BACKGROUND OF THE INVENTION

Various puller devices have been utilized over the years to remove articles mounted in surrounding relationship around an interiorly disposed object. For example, pullers have been utilized to extricate such items as various pulleys, gears, bearings, and specific automotive parts such as differential bearings, bushings, pulleys, and pitman arms. Such pulling devices have a wide array of applications, but have particular usage in machinery or automotive applications.

In general, pullers of various designs effectuate a common functionality. In many cases, typical pullers operate by simultaneously pulling on the surrounding articles to be extracted and bearing or "pushing" against the interiorly disposed object. A common technique for providing this simultaneous pulling and pushing dynamic is to utilize a pulling frame which grasps a rearward surface of the article to be extracted, and a pushing device disposed substantially centrally within the pulling frame to bear against the interiorly disposed stationary object. The pushing device is positioned relative to the pulling frame such that a user may axially move the pushing device with respect to the pulling frame. In many instances, the pushing device is a threaded rod that is threadably received through an aperture in the pulling frame, such that rotation of the threaded rod axially moves the rod in a respective direction toward or away from the article to be extracted. Typically, the user rotates the threaded rod to axially move the rod into a bearing or pushing relationship with the interiorly disposed object, while positioning the pulling or grasping frame on a rearward surface on the article to be extracted. Continued rotation of the threaded rod causes the pulling frame to move in a direction opposite of the threaded rod axial motion, such that the article to be removed axially moves with respect to the interiorly disposed object. In such a manner, articles may be "pulled" from surrounding relationship with interiorly disposed objects.

A variety of puller device configurations are employed for particular applications. Typically, puller frame configurations are adapted for use in particular pulling applications. For example, the puller frame may include hinge opposing jaws, or adjustable width jaws, wherein the jaws generally comprise opposing parallel arms forming a jaw. In some applications, the puller frame may include a semi-circular or circular pulling surface for transmitting force against the articles to be extracted. In still other pulling applications, the pulling frame may comprise a fixed dimension jaw having parallel and opposed gripping arms fixedly attached to the frame base.

A particular pulling application pertinent to the present invention is the pulling of automotive pitman arms. Several puller frame configurations have been utilized in pitman arm pullers to date. Pitman arm pullers presently used include semi-conical housings utilizing semi-circular pulling surfaces, dual-arm adjustable width jaws, and fixed dimension dual arm jaws. Fixed-dimension puller frame jaws typically reflect desired strength and durability characteristics necessary for relatively heavy duty pulling applications. In particular, pitman arms exposed to environmental conditions over extended periods of time may become corroded, and therefore difficult to remove. In such situations, a relatively heavy duty and durable puller device is desired. Thus, heavy duty fixed-dimension jaw puller frames are desirable for pulling automotive pitman arms.

Pitman arm pullers in use today, however, utilize a pushing device, typically a threaded rod, that is threaded through a respective aperture in the puller frame, wherein the threaded rod has an integral nut for rotating the threaded rod external from the puller frame. For example, common puller devices utilize a threaded rod threaded through a base structure of the puller frame, wherein the threaded rod may be actuated at a location external to the jaws of the puller frame. Such positioning of the integral nut requires actuation of the threaded rod at a position external to the puller frame jaws.

In many automotive pitman arm pulling applications, the pitman arms are positioned in relatively compact environments. For example, many automotive pitman arms are positioned such that one or more parts must be removed before access to the pitman arm is possible. The difficulty in access to the pitman arm is primarily due to the fact that the threaded rod (pushing means) of typical puller devices extend outwardly from the puller frame, thereby increasing the space required to correctly position the puller frame on or around the article to be pulled. In many cases, an entire assembly including the pitman arm must be removed from the automobile prior to extracting the pitman arm from the assembly. Often times, such assembly removal requires disassembly of power steering fluid lines from the steering box, which adds significantly to the time and effort need to extract the pitman arm. Such disassembly and removal of parts to access the pitman arm is necessary due to the external configurational nature of the actuation means on the threaded rod.

Therefore, it is a principle object of the present invention to provide a puller apparatus for pulling articles in compact environments.

It is another object of the present invention to provide a puller apparatus which is sized and configured to extract automotive pitman arms positioned in compact environments.

It is a further object of the present invention to provide a puller apparatus that is sized and configured to extract automotive pitman arms without first removing or disassembling surrounding parts.

It is a still further object of the present invention to provide an improved puller apparatus incorporating a pushing means having an actuation means disposed within the jaws of the puller frame.

It is a further object of the present invention to provide a puller apparatus utilizing a threaded rod as a pushing means having an integral nut disposed on a proximal portion of the threaded rod, within the jaws of the puller frame.

It is a still further object of the present invention to provide a puller apparatus incorporating a pushing means having an actuation means immediately adjacent a pressure tip used to transmit pushing forces on an object around which the article to be pulled is mounted.

Another object of the present invention is to provide a puller apparatus incorporating a pushing means having an actuation means with a pressure tip formed integrally thereon, which pressure tip transmits pushing force to an object around which the article to be pulled is mounted.

It is yet a further object of the present invention to provide a threaded rod for use in a puller apparatus, which threaded rod has an actuation means proximal to the object around which the article to be pulled is mounted.

Another object of the present invention is to provide a puller apparatus sized and configured to allow a user to actuate a threaded rod at a position within the jaws of the puller frame.

SUMMARY OF THE INVENTION

By means of the present invention, the efficiency for pulling various articles mounted in surrounding relationship around an interiorly disposed object is greatly enhanced. Through the utilization of the puller apparatus of the present invention, articles such as automotive pitman arms may be more easily accessed and removed. In essence, the user of the present invention may directly pull certain articles, including automotive pitman arms, in relatively compact environments without first removing extraneous parts. The puller apparatus of the present invention incorporates a pushing means disposed in a pulling frame, which pushing means includes an actuation means disposed within the confines of the puller frame on a portion of the pushing means proximal to the interiorly disposed object. In such a manner, the user may actuate the pushing means at a location within the puller frame, thereby eliminating the necessity of having access space surrounding the puller frame.

In a particular embodiment of the present invention, the improved puller apparatus includes a puller frame having a base and at least one outstanding arm extending therefrom, wherein the arm has an inwardly extending gripping projection for transmitting pulling force to an article being pulled, and the base having an aperture extending therethrough, which aperture is sized and configured to threadably receive a threaded rod therein. The threaded rod, which acts as a pushing means, preferably includes an actuation means disposed at a portion of the rod proximal to the article being pulled. The actuation means is preferably configured to impart pushing force directly upon the relatively stationary interiorly disposed object around which the article to be pulled is mounted.

The puller apparatus preferably incorporates a plurality of upstanding arms, and more particularly, two generally opposing arms. In some embodiments, the upstanding arms include recessed portions to allow improved access to the actuation means by engaging tools.

In preferred embodiments of the present invention, the actuation means includes a pressure tip formed integrally with the actuation means for operably transmitting pushing force against the interiorly disposed object.

In another embodiment of the present invention, the puller apparatus includes a substantially u-shaped frame having a base and a plurality of gripping arms extending substantially perpendicularly from opposing ends of the base, wherein the gripping arms extend in substantially parallel relationship with one another, and respective ends of the gripping arms which are distal from the base include inwardly disposed gripping projections extending substantially toward one another. The base preferably includes an aperture formed therein, which aperture forms an open channel extending between an upper and a lower surface of the base, the aperture being sized and configured to receive pushing means therein, which pushing means includes an actuation means disposed on a proximal portion thereof at a position within the u-shaped frame, such that actuation of the actuation means axially moves the pushing means with respect to the base.

In a further embodiment of the present invention, pushing means are provided for use in a puller apparatus, wherein the pushing means includes a distal end and an opposed proximal end, with the proximal end having an actuation means disposed thereon. The actuation means preferably includes a pressure tip extending from an upper surface thereof. The pushing means is adapted to be disposed in an aperture in the pulling frame such that actuation of the actuation means causes axial motion in the pushing means, whereby the pressure tip moves coaxially with the pushing means to bear against a stationary object around which an article to be pulled is mounted. In more preferred embodiments, the pushing means is a threaded rod and is threadably received in the aperture, which is correspondingly threaded to mate with the threads of the threaded rod.

The present invention also contemplates a method for pulling various articles from surrounding mounted relationship with an interiorly disposed object, whereby the puller apparatus of the present invention is situated with respective pulling projections positioned on a rearward surface of the article to be pulled. Actuation of the actuation means axially moves the pushing means in a direction toward the interiorly disposed object. Continued actuation of the actuation means creates a pressure between the pressure tip and the object, which results in a corresponding pulling force that is transmitted to the article to be pulled via the pulling protrusions.

DETAILED DESCRIPTION OF THE PREFERRED EMBODIMENTS

The objects and advantages enumerated above together with other objects, features and advances represented by the present invention will now be presented in terms of detailed embodiments described with reference to the attached drawing figures which are intended to be representative of various possible configurations of the invention. Other embodiments and aspects of the invention are recognized as being within the grasp of those having ordinary skill in the art.

Figure 1:
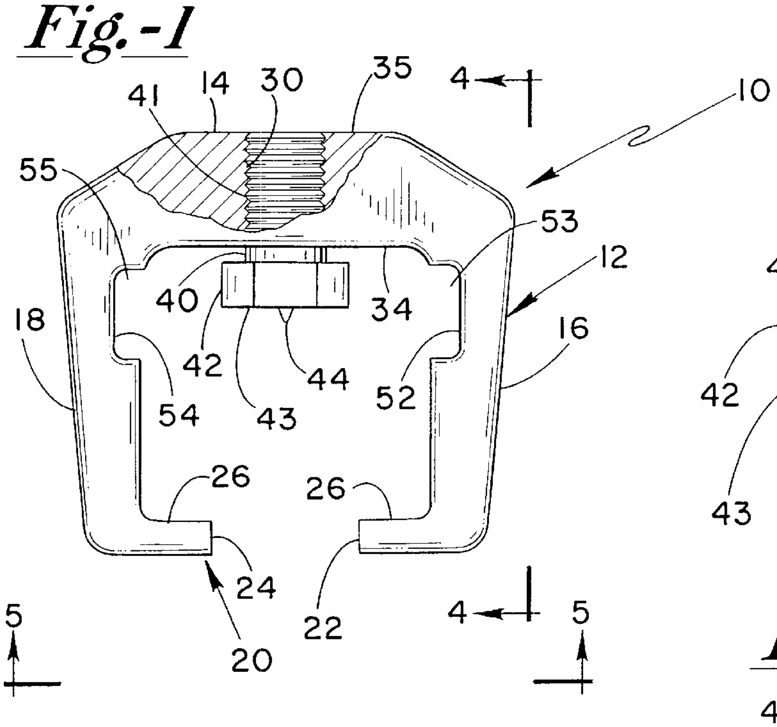
FIG. 1 is a side view showing the puller apparatus of the present invention.

Referring now by characters of reference to the drawings, and first to FIG. 1, a puller apparatus 10 of the present invention is shown. Puller apparatus 10 includes a frame 12, which frame 12 includes a base portion 14 and first and second gripping arms 16, 18 respectively. The first and second gripping arms 16, 18, in combination, form jaws 20 of puller frame 12. First and second arms 16, 18 preferably extend from opposing ends of base portion 14 in substantially parallel relationship with one another. In preferred embodiments, first and second arms 16, 18 extend generally perpendicularly from base portion 14.

As shown in FIG. 1, first and second arms 16, 18 each include pulling protrusions 22, 24, respectively. Preferably, pulling protrusions 22, 24 extend inwardly toward one another in jaws 20. Protrusions 22, 24 have an inner surface

26 upon which rearward surfaces of articles to be pulled bear against in the pulling sequence. In preferred embodiments, protrusions 22, 24 are disposed in opposing orientation, such that pulling forces are distributed equally upon the article to be pulled. In this manner, puller apparatus 10 does not impart undesirable oblique forces onto the article to be pulled. Direct, linear pulling is desired to avoid binding or torquing of the article with respect to the interiorly disposed object around which the article to be pulled is mounted. Therefore, a diametrically opposed configuration for gripping arms 16, 18 and pulling protrusions 22, 24 is desired. However, other pulling arm configurations are contemplated in the present invention, including a unitary gripping arm having a relatively large surface area pulling protrusion, or a puller apparatus utilizing more than two gripping arms. In all cases, however, substantially linear force imposition along a plane parallel to the gripping arms is preferred.

Frame 12 preferably includes an aperture 30 disposed in base portion 14 thereof. Aperture 30 preferably forms an open channel extending between an upper surface 34 and a lower surface 35 of base portion 14. Aperture 30 is preferably sized and configured to receive pushing means 40, which may be utilized to progressively push against an interiorly disposed object around which the article to be pulled is mounted. Such pushing on the interior object by means 40 creates the countervailing pulling force with which pulling protrusions 22, 24 transmit to the article to be pulled. Such a pulling force is developed between means 40 and frame 12 when means 40 is progressively pushed against the relatively stationary interior object, such that frame 12 is urged in an opposite direction of the pushing force being applied to the interiorly disposed object.

A variety of other means for developing a pushing force upon the interiorly disposed object are contemplated in the present invention. Such pushing means may include, for example, ratcheted rods, compression springs, and any other pushing means which may be actuated or initiated at a position with frame 12. In preferred embodiments, however, pushing means 40 comprises a threaded rod.

As illustrated in FIG. 1, aperture 30 is preferably threaded to receive pushing means 40 therein. Aperture 30 is desirably threaded to create axial motion for pushing means 40 upon rotation of pushing means 40 while at least partially disposed in threaded aperture 30. Such axial motion is the source for pushing force transmitted by pushing means 40 upon the interiorly disposed object. In a particular embodiment, pushing means 40 includes threads corresponding with threaded aperture 30, which threads may be of any desired pitch and spacing. Preferably, the threads are of metric dimension to be standard across a wide variety of applications. Other dimensions, however, may be similarly used.

As illustrated in FIG. 1, pushing means 40 further includes an actuation means 42 disposed on a portion of pushing means 40 proximal to jaws 20. Actuation means 42 is preferably integrally formed with pushing means 40 such that rotation of actuation means 42 correspondingly rotates pushing means 40. Actuation means 42, however, may instead be operably coupled to pushing means 40 without being integrally formed with pushing means 40, such that rotation of actuation means 42 axially moves pushing means 40 while actuation means 42 remains axially stationary. In either case, rotation of actuation means 42 progressively moves pushing means 40 axially so as to create desired levels of pushing force upon an interiorly disposed object. A corresponding resistive force directed oppositely of the pushing force is developed by pressure between pushing means 40 and the interiorly disposed object when pushing force is applied thereto. The resistive force is transmitted through pushing means 40 to frame 12 via threads 41 on pushing means 40. Such resistive force creates the pulling force which is transmitted from frame 12 to the article to be pulled at surface 26 of pulling protrusions 22, 24. The pulling force preferably acts to extract the article in a linear manner.

Figure 2:
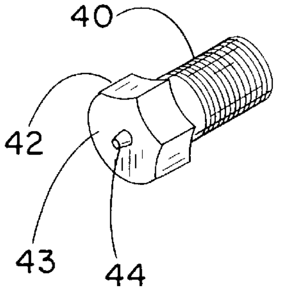
FIG. 2 is a perspective view of a threaded rod in accordance with the present invention.

In preferred embodiments, actuation means 42 substantially comprises a hexagonal nut formed integrally with pushing means 40. A variety of other embodiments for actuation means 42 are contemplated in the present invention, including fittings configured to receive tools other than typical wrenches. The hexagonal nut is preferably a standard size for mating with typical hand or power tools. The threaded rod with integral actuation means may be more easily viewed in FIG. 2, which illustrates pushing means 40 in an isolated view. As can be seen in FIG. 2, actuation means 42 further includes a pressure tip 44 disposed substantially centrally on a top surface 43 of actuation means 42. In preferred embodiments, pressure tip 44 provides a location for transmitting pushing force from pushing means 40 to the interiorly disposed object. Pressure tip 44 is preferably centrally located on top surface 43 of actuation means 42 for providing uniform pushing force on the object. Preferably, pressure tip 44 is formed integrally with actuation means 42. In some embodiments, pressure tip 44 may be disposed on a proximal portion of pushing means 40, whereby pressure tip 44 is relatively more proximal to the interiorly disposed object than actuation means 42 such that pressure tip 44 alone comes into contact with the object upon axial motion of pushing means 40.

In an alternative embodiment of the present invention, pressure tip 44 is formed integrally with pushing means 40, while actuation means 42 is not integral with pushing means 40. In such an embodiment, rotation of actuation means 42 axially displaces pushing means 40 in a direction generally perpendicular toward or away from the interiorly disposed object, whereby pushing force upon the object is transmitted through the pressure tip disposed on a proximal surface of pushing means 40.

Figure 3:
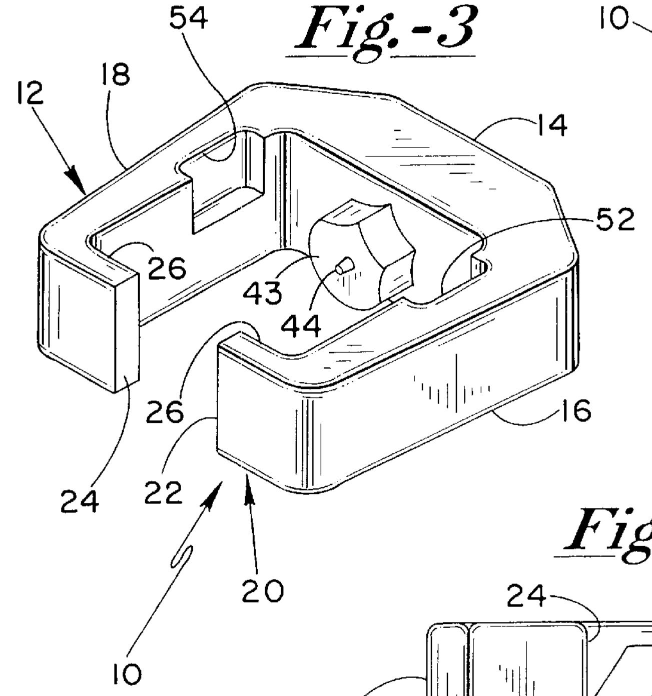
FIG. 3 is a perspective view of a puller apparatus of the present invention.

As illustrated in FIGS. 1 and 3, gripping arms 16, 18 preferably include recessed portions 52, 54 respectively. Recessed portions 52, 54 are preferably disposed in respective gripping arms 16, 18 adjacent base portion 14. Recessed portions 52, 54 are preferably provided to allow a wrench or other tool engaging actuation means 42 to more fully rotate about a longitudinal axis of pushing means 40. In such a manner, a relatively larger degree of axial motion of pushing means 40 may be obtained in each rotational stroke of the engaging tool, due to the fact that each rotating stroke can pass through a longer arcuate segment between distal rotation points 53, 55 in respective gripping arms 16, 18. As shown in FIG. 3, recessed portions 52, 54 preferably extend only partially through a depth "d" of gripping arms 16, 18. Such partial extension through gripping arms 16, 18 is preferably maintained to retain overall strength of frame 12.

Frame 12 of puller apparatus 10 is preferably fabricated from a strong and durable material such as stainless steel, nickel steel, or other hardened metal substance. Materials utilized in the present invention may vary, so long as strength and durability are maintained. Similarly, pushing means 40, along with actuation means 42 and pressure tip 44, is preferably fabricated from a strong and durable material, such as steel or any other durable metal material.

Figure 4:
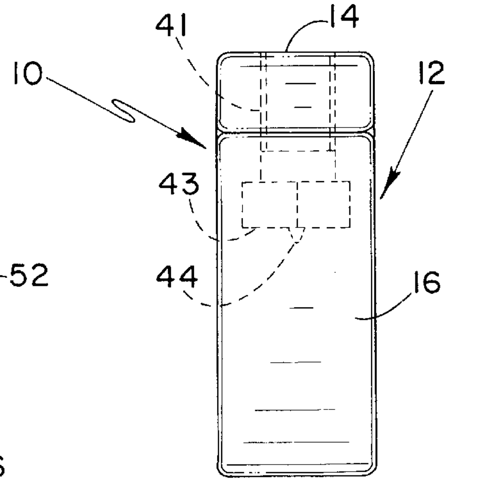
FIG. 4 is an end view of the apparatus illustrated in FIG. 1, as taken along cut line 4.
Figure 5:
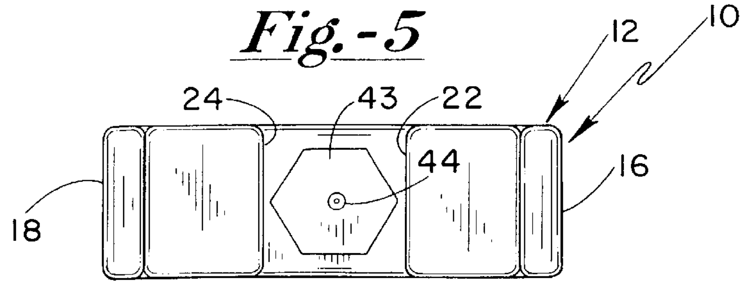
FIG. 5 is a top view of the apparatus illustrated in FIG. 1, as taken along cut line 5.

For further reference, FIGS. 4 and 5 illustrate a side view and an end view, respectively, as taken along respective cut lines 4 and 5 of FIG. 1.

A particular example for the use of puller apparatus 10 is in the pulling of automotive pitman arms. In use, puller apparatus 10 is situated with pulling projections 22, 24 positioned on a rearward surface of the portion of the pitman arm mounted in surrounding relationship to a splined socket joint bolt. Due to the grooved nature of the socket joint bolt, the pitman arm must be pulled in a direction parallel to a longitudinal axis of the bolt. Upon placement of the puller apparatus on the pitman arm, a user then rotates actuation means 42 with the use of a wrench or other tool. Rotation of actuation means 42 axially moves 40 in a direction perpendicularly toward a facing surface of the joint bolt. Continued rotation of actuation means 42 transmits a pushing force upon the joint bolt surface via pressure tip 44. Since the joint bolt is substantially stationary in an axial direction, a corresponding pulling force is developed and transmitted to the pitman arm via pulling protrusions 22, 24 of frame 12. Further rotation of actuation means 42 results in relative opposing movement between 40 and puller frame 12, such that the pitman arm is extracted from surrounding relationship of the joint bolt.

The above described process saves the user a significant amount of time in pulling the pitman arm. The utilization of puller devices in use today requires the user to remove the assembly including the attached pitman arm from the automobile which process typically entails disconnecting power steering lines and the pitman arm assembly from the steering box. Such a process to pull and replace the pitman arm typically requires up to two hours of labor by a skilled mechanic. Through the utilization of the puller apparatus of the present invention, the same procedure may be completed in substantially less time, thereby saving expense for both the mechanic and the automobile owner. Such timesavings are a result of the elimination of the requirement of removing parts from the automobile prior to extracting the pitman arm, as well as the subsequent reassembly of such parts.

Additionally, utilization of the present invention greatly simplifies pulling procedures, in that relatively easy access to an actuation means for developing a pushing force upon an interiorly disposed object is provided. Further, the apparatus of the present invention is preferably designed to withstand high levels of torque required in many automotive and other mechanical applications.

The invention has been described herein in considerable detail in order to comply with the patent statutes, and to provide those skilled in the art with the information needed to apply the novel principles and to construct and use embodiments of the invention as required. However, it is to be understood that the invention can be carried out by specifically different devices and that various modifications can be accomplished without departing from the scope of the invention itself.

What is claimed is:

1. An improved puller apparatus, comprising:

a) a puller frame including a base and an upstanding arm extending therefrom, said arm having an inwardly extending gripping projection for transmitting pulling force to an article being pulled, and said base having an aperture extending therethrough; and b) a threaded rod threadably received in said aperture, said rod including a distinct actuation means disposed at a portion of said rod proximal to the article being pulled, said actuation means being specifically configured for mating engagement with conventional tools so as to operably translate actuation of said actuation means into axial motion of said rod to thereby selectively impart pushing force directly upon a relatively stationary interiorly disposed object around which said article is mounted.

2. An improved puller apparatus as in claim 2 wherein said puller frame includes a plurality of upstanding arms.

3. An improved puller apparatus as in claim 1 wherein said puller frame is sized and configured to receive such conventional tools for engaging said actuation means.

4. An improved puller apparatus as in claim 3 wherein said upstanding arms include recessed portions to allow improved access to said actuation means by said tools.

5. An improved puller apparatus as in claim 1 wherein a longitudinal axis of said threaded rod is substantially parallel to the pulling force being applied to the article being pulled.

6. An improved puller apparatus as in claim 1 wherein said actuation means is operatively disposed between said base and the article being pulled.

7. An improved puller apparatus as in claim 6 wherein said actuation means includes a pressure tip for operably transmitting pushing force against said interiorly disposed object.

8. An improved puller apparatus as in claim 7 wherein said actuation means is integral with said proximal portion of the threaded rod.

9. A puller apparatus, comprising:

a) a substantially u-shaped frame having a base and a plurality of gripping arms extending substantially perpendicularly from opposing ends of said base, said gripping arms extending in substantially parallel relationship with one another, and respective ends of the gripping arms distal from said base including inwardly disposed gripping projections extending substantially toward one another, said base having an aperture formed therein, said aperture forming an open channel extending between an upper and a lower surface of said base; and b) pushing means being operably received in said aperture, said pushing means having a proximal portion proximal to said gripping projections and a distal portion, said pushing means including a distinct actuation means disposed on said proximal portion of said pushing means at a position within said u-shaped frame, said actuation means being specifically configured for mating engagement with conventional tools, such that actuation of said actuation means axially moves said pushing means with respect to said base.

10. A puller apparatus as in claim 9 wherein said pushing means is a threaded rod which is threadably received in said aperture.

11. A puller apparatus as in claim 10 wherein said actuation means is fixedly attached to said threaded rod.

12. A puller apparatus as in claim 11 wherein said actuation means is threadably rotatable on said threaded rod such that rotation of said actuation means axially moves said threaded rod with respect to said actuation means.

13. A puller apparatus as in claim 9 wherein said actuation means comprises a standard hexagonal nut.

14. A puller apparatus as in claim 10 wherein said actuation means is formed integrally with a proximal end of said threaded rod.

15. A puller apparatus as in claim 11, including a pressure protrusion extending perpendicularly outwardly from an upper surface of said actuation means.

16. A puller apparatus as in claim 11 wherein said actuation means is operatively disposed between said base and an object being pulled.

17. A puller apparatus as in claim 10 wherein said gripping arms include one or more recessed portions which are sized and configured to provide desired access by such tools for engaging said actuation means.

18. Pushing means for use in a puller apparatus, said pushing means comprising:

a distal end and an opposed proximal end, the proximal end having a distinct actuation means disposed thereon, said actuation means including a pressure tip integral thereto and extending from an upper surface thereof, said pushing means being adapted to be disposed in an aperture in said pulling frame such that actuation of said actuation means causes axial motion in said pushing means, whereby said pressure tip moves coaxially with said means to bear against a stationary article around which an object to be pulled is mounted.

19. Pushing means as in claim 18 wherein said means comprises a threaded rod, which threaded rod is threadably received in a correspondingly threaded aperture in said pulling frame.

20. Pushing means as in claim 19 wherein rotation of said actuation means causes the axial motion in said threaded rod.

21. A method for pulling an article mounted in surrounding relationship around a relatively stationary interiorly disposed object, comprising:

a) providing a puller apparatus comprising a puller frame including a base and opposed upstanding arms extending therefrom, said arms including inwardly extending gripping projections for transmitting pulling force to said article being pulled, said base having an aperture extending therethrough, and a threaded rod threadably received in said aperture, said rod including a distinct actuation means disposed at a portion of said rod proximal to said article being pulled, said actuation means being specifically configured for mating engagement with conventional tools so as to operably translate actuation of said actuation means into axial motion of said rod to thereby selectively impart pushing force directly upon said interiorly disposed object;

b) positioning said puller apparatus on a rearward surface of said article to be pulled; and c) rotating said actuation means to axially move said threaded rod in a direction perpendicularly toward said interiorly disposed object, such that pressure developed between said interiorly disposed object and said threaded rod creates a corresponding pulling force which is transmitted to the article being pulled via said gripping projections.

22. A method as in claim 21 wherein said actuation means is formed integrally with said threaded rod.

23. A method as in claim 22 wherein said actuation means is operably disposed within said puller frame.

24. A method as in claim 22 wherein said actuation means includes a pressure tip for operably transmitting a pushing force against said interiorly disposed object.

* * * * *

UNITED STATES PATENT AND TRADEMARK OFFICE

CERTIFICATE OF CORRECTION

PATENT NO. : 6,665,921 B2 
DATED : December 23, 2003
INVENTOR(S) : Bryan Winterfeldt et al.

It is certified that error appears in the above-identified patent and that said Letters Patent is hereby corrected as shown below:

<u>Column 8,</u>
Line 4, after the words “as in claim” delete “2” and add -- 1 --.

Signed and Sealed this

Twenty-third Day of March, 2004

JON W. DUDAS
*Acting Director of the United States Patent and Trademark Office*